United States Patent
Boivie et al.

(10) Patent No.: US 8,332,652 B2
(45) Date of Patent: Dec. 11, 2012

(54) COMPUTING DEVICE THAT SECURELY RUNS AUTHORIZED SOFTWARE

(75) Inventors: Richard H. Boivie, Monroe, CT (US); William Eric Hall, Clinton, CT (US)

(73) Assignee: International Business Machines Corporation, Armonk, NY (US)

( * ) Notice: Subject to any disclaimer, the term of this patent is extended or adjusted under 35 U.S.C. 154(b) by 1605 days.

(21) Appl. No.: 10/677,933

(22) Filed: Oct. 1, 2003

(65) Prior Publication Data

US 2005/0076226 A1 Apr. 7, 2005

(51) Int. Cl.
*G06F 21/00* (2006.01)
(52) U.S. Cl. .................. 713/187; 713/189
(58) Field of Classification Search .......... 713/187
See application file for complete search history.

(56) References Cited

U.S. PATENT DOCUMENTS

| 5,481,613 | A  | * | 1/1996 | Ford et al. ............... 380/30 |
| 5,778,070 | A  | * | 7/1998 | Mattison ................. 713/191 |
| 6,185,685 | B1 | * | 2/2001 | Morgan et al. ........... 713/183 |
| 6,397,331 | B1 | * | 5/2002 | Ober et al. .............. 713/164 |
| 2001/0050990 | A1 | * | 12/2001 | Sudia ................... 380/286 |
| 2003/0188176 | A1 | * | 10/2003 | Abbondanzio et al. .... 713/191 |

* cited by examiner

*Primary Examiner* — Gilberto Barron, Jr.
*Assistant Examiner* — Devin Almeida
(74) *Attorney, Agent, or Firm* — F. Chau & Associates, LLC; Anne V. Dougherty, Esq.

(57) ABSTRACT

A computing device for securely executing authorized code includes a protected memory for storing authorized code, which contains an original digital signature, and a processor in signal communication with the protected memory for preparing to execute code from the protected memory by verifying that a digital signature contained in the code is original in accordance with a public key, and if the original digital signature is verified, then branching to a copy of the authorized code in the protected memory to begin execution.

15 Claims, 6 Drawing Sheets

COMPUTING DEVICE THAT SECURELY RUNS AUTHORIZED SOFTWARE

BACKGROUND OF THE INVENTION

The present invention relates generally to a secure computing device that protects its secrets and its integrity using hardware mechanisms and advanced cryptographic techniques.

There are a number of situations in which it is important to protect the integrity of a computing device from physical tampering. For example, a biometric security device would not provide much security if an attacker could tamper with the device and compromise its function. Similarly, a cable TV company's set-top boxes would not provide much security and might allow an attacker to watch the pay-per-view movies for free, for example, if the attacker could compromise the function of the set-top box.

The federal government has issued standards relating to "secure computing". The National Institute of Standards and Technology has issued Federal Information Processing Standards Publication, FIPS PUB 140-1, defining "Security Requirements for Cryptographic Modules". Security level 4 provides the highest level of security and includes an "envelope" of protection around the cryptographic module that provides protection against attempts to penetrate the envelope. If an attacker attempts to penetrate the security envelope, the attempt should be detected and all critical security parameters zero-ized. As FIPS PUB 140-1 states: "Level 4 devices are particularly useful for operation in a physically unprotected environment when an intruder could possibly tamper with the device".

Accordingly, what is needed is a secure computing device capable of protecting its secrets and its integrity using hardware mechanisms and advanced cryptographic techniques.

SUMMARY OF THE INVENTION

The above and other drawbacks and deficiencies of the prior art are overcome or alleviated by a secure computing device that protects secrets, protects its own integrity, and that can run any software that is digitally signed by the owner of the device.

A computing device for securely executing authorized code includes a protected memory for storing authorized code, which contains an original digital signature, and a processor in signal communication with the protected memory for preparing to execute code from the protected memory by verifying that a digital signature contained in the code is original in accordance with a public key, and if the original digital signature is verified, then branching to a copy of the authorized code in the protected memory to begin execution.

These and other aspects, features and advantages of the present disclosure will become apparent from the following description of exemplary embodiments, which is to be read in connection with the accompanying drawings.

BRIEF DESCRIPTION OF THE DRAWINGS

The present invention may be better understood with reference to the following exemplary figures, in which.

DETAILED DESCRIPTION OF PREFERRED EMBODIMENTS

A secure computing device is provided that protects secrets and its own integrity. The secure computing device is further capable of running any compatible software that is digitally signed by the owner of the device. Digitally signed code, as defined herein, comprises code having a hash (e.g., a secure hash algorithm or "SHA-1", as known in the art) with a digital signature. The secure computing device, which can run software that is digitally signed by an authorized party and protect the integrity of that software during execution, will not run any software that is not signed by an authorized party.

The secure computing device described herein protects its secrets and its integrity using hardware mechanisms and advanced cryptographic techniques. This secure computing device can run any software that the owner of the device chooses, and the owner can update the software on the device at any time. The secure computing device protects the integrity of this software over the "lifetime" of the software. The software is protected from the time it "ships", throughout its execution until the software is no longer needed. Thus an attacker cannot compromise the function of the device.

The "owner" of a device is not necessarily the "user" of the device. For example, the owner of a set-top box might be a cable television ("TV") company, while the user of the set-top box might be a potential attacker. In this case, the secure computing device could prevent an attacker from modifying the function of the set-top box in a way that would allow the attacker to watch all the pay-per-view movies for free, for example.

In the case of a personal data assistant ("PDA"), the secure computing device could prevent an attacker that gains physical control of the PDA from accessing confidential information stored on the PDA. The secure computing device could also prevent the attacker from modifying the function of the device to include a "Trojan horse" that would record and mail passwords or other confidential information to the attacker.

The secure computing device described here protects secrets and its own integrity using hardware mechanisms and advanced cryptographic techniques. Implementation of the device includes a public key that is inside the device that is used to check the signature of digitally signed code.

Figure 1:
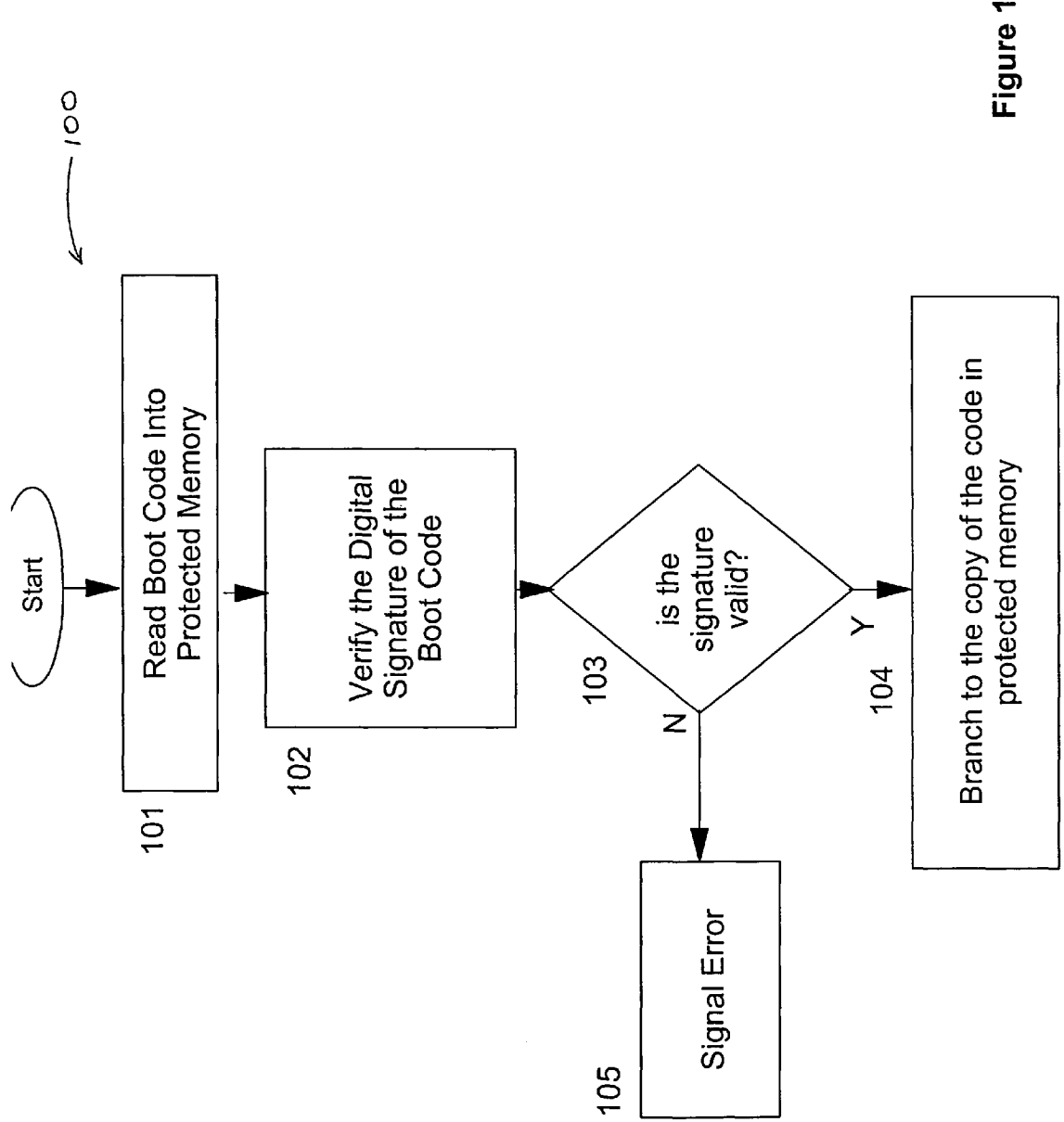
FIG. 1 shows a flow diagram of a boot process for a secure computing device in accordance with the principles of the present disclosure.

As shown in FIG. 1, a flow diagram of a boot process for a secure computing device in accordance with the principles of the present disclosure is indicated generally by the reference numeral 100. At boot time, a read-only memory ("ROM") inside the device reads the boot code from a standard boot address and copies the boot code into "protected memory" at step 101, verifies the digital signature on the boot code at step 102, checks whether the digital signature is valid at step 103, and, if valid, branches to the copy of the code in protected memory at step 104. If, on the other hand, the digital signature is found to be invalid at step 103, an error is signaled at step 105.

Here, the protected memory can be a memory that is inside the computing device and inaccessible to an attacker that might want to compromise the integrity of the device. Alternatively, the protected memory can be a memory that is outside of the device and protected by an inline encryption scheme as illustrated in FIG. 2.

Figure 2:
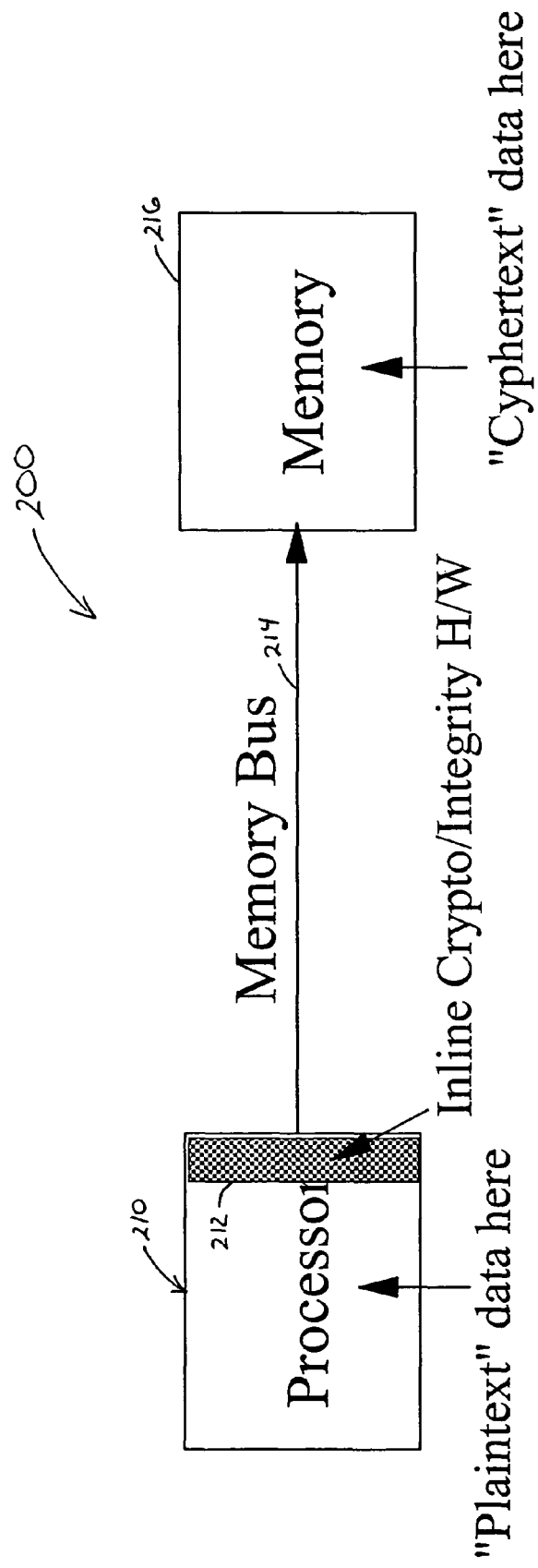
FIG. 2 shows a schematic diagram of a secure computing device in accordance with the principles of the present disclosure.

Turning to FIG. 2, a secure computing device in accordance with the principles of the present disclosure is indicated generally by the reference numeral 200. The secure computing device 200 includes a processor 210 in signal communication with a memory bus 214, which is in signal communication with a memory 216. The processor 210 includes inline cryptography and integrity hardware 212. The processor 210 uses "plain text" data, while the memory 216 uses "ciphertext" data. In this exemplary embodiment, the memory 216 is a protected memory that is outside of the device, and protected by the hardware 212 using inline encryption.

In one embodiment of this invention, a symmetric key inside the device is used to encrypt information that is written outside the chip and decrypt information as it is read back in. This inline encryption process protects both the confidentiality of information stored outside of the chip as well as the integrity of that information.

The public key can be in an on-chip ROM and thus fixed for all copies of a design, or in fuses that are programmed at the wafer stage (e.g., laser trimmed) or at system assembly time (e.g., in-system programmable). The last option allows the chip manufacturer to make and package parts without a customer-specific public key but this option is not available in certain chip technologies.

Figure 7:
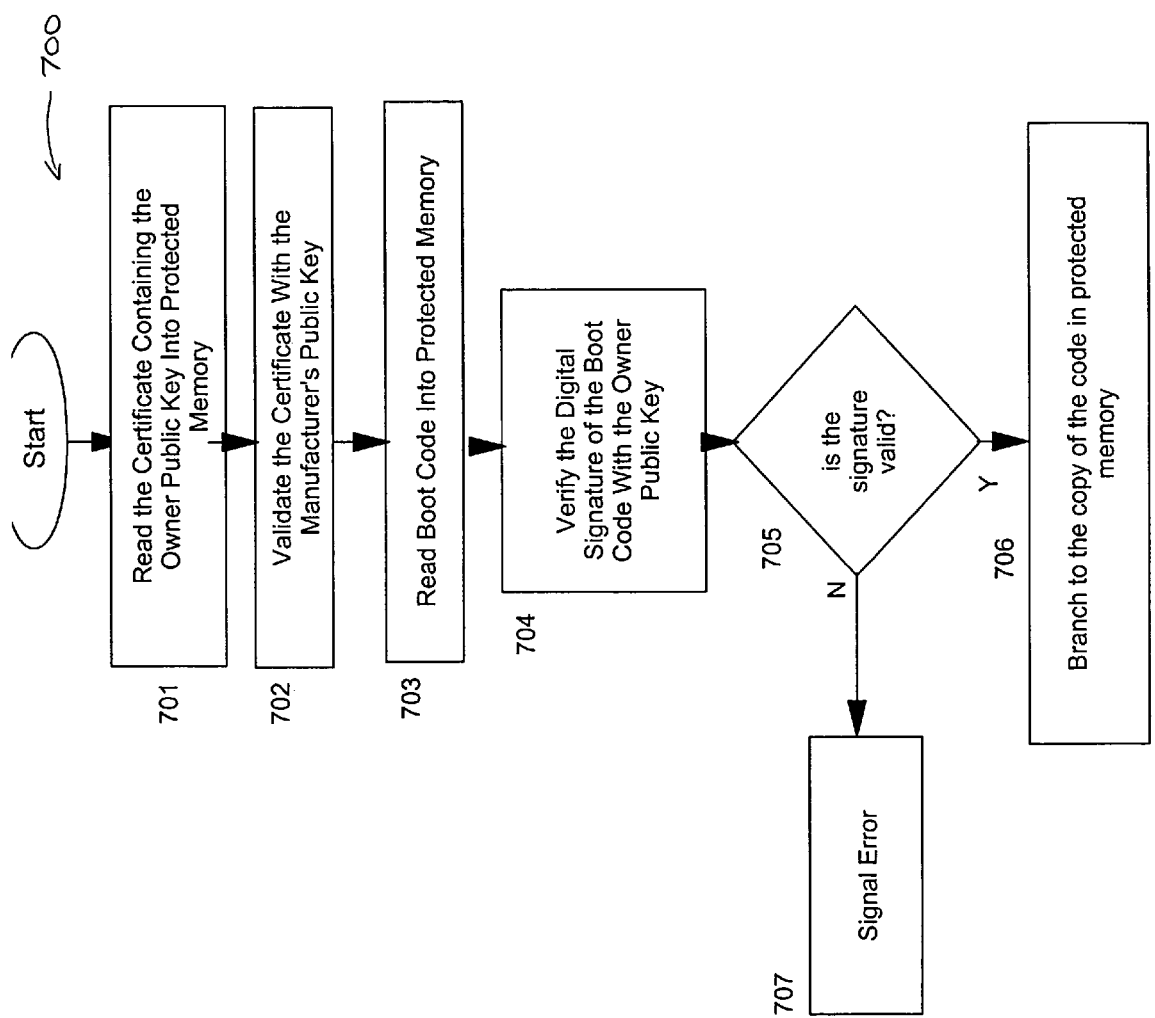
FIG. 7. shows a flow diagram of an alternate embodiment modified boot process for a secure computing device in accordance with the principles of the present disclosure.

One solution to this problem is to include a small number of on-chip laser trimmed fuses to identify the "owner number" for a particular chip. If the chip also includes the public key of the chip manufacturer, the chip manufacturer's public key can be used to validate a certificate that provides the public key for a given owner number. FIG. 7, discussed later, illustrates how the boot process might work in this case.

The integrity protection scheme defends against modification of data as well as replay and relocation of data. A "replay" of a data block is the replacement of that data block with a value that was valid at that data block's address at some earlier point in time. A "relocation" of a data block is the replacement of the data block with a block that is valid at a different address. The encryption/integrity scheme may use an encryption algorithm, such as the data encryption standard ("DES") or advanced encryption standard ("AES") with time and location sensitivity, to defend against replay and relocation of data.

The encryption of a plaintext block is a function of the plaintext data, an encryption key and a "whitening" value. The whitening value is a function of a whitening key, the block's "address" and a counter or "version number" that is incremented each time a block is written. The use of the block's address in the whitening value defends against relocation and the use of the version number defends against replay.

Figure 3:
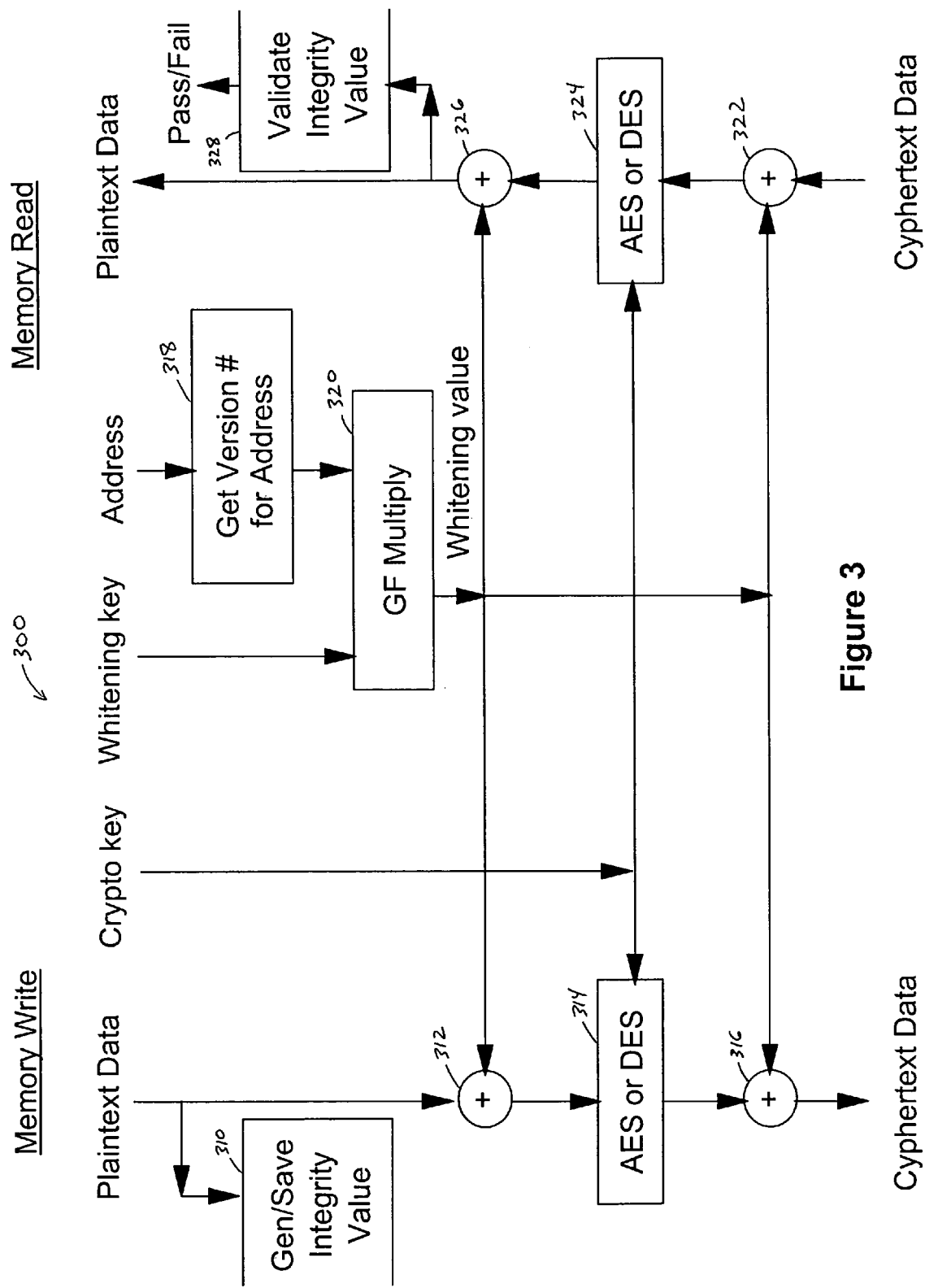
FIG. 3 shows a process diagram for encryption, decryption and maintaining integrity of data for a secure computing device in accordance with the principles of the present disclosure.

Turning now to FIG. 3, data flow for encryption, decryption and integrity of data for a secure computing device is indicated generally by the reference numeral 300. In a Memory Write portion of the data flow 300, Plaintext data is received, for which an integrity value is generated and saved at a function block 310. The received Plaintext data is also received at a first summing block 312, which also receives a Whitening Value to sum with the Plaintext data. The output of the summing block 312 is received and encrypted by a function block 314, which also receives a Cryptographic Key and encrypts the data using AES or DES, for example. The output of the encryption block 314 is received by a second summing block 316, which also receives a Whitening Value to sum with the encrypted data. The output of the summing block 316 comprises Ciphertext data to be stored in protected memory.

The address of the data is received by a function block 318, which gets a version number for the received address. The output of the block 318 is received by a Galois Field ("GF") multiply block 320. The GF multiply block 320 also receives a Whitening Key, and thereby produces the Whitening Value.

In a Memory Read portion of the data flow 300, Ciphertext data is retrieved from protected memory to a third summing block 322. The summing block 322 sums the retrieved Ciphertext data with the Whitening Value. A decryption block 324 receives the output of the summing block 322, receives the Cryptographic Key, and produces a decrypted output using AES or DES, for example. The output of the decryption block 324 is received by a fourth summing block 326, which sums it with the Whitening Value to produce Plaintext data. The Plaintext data output from the fourth summing block 326 is received at a function block 328, which validates the Integrity Value of the Plaintext data, and produces a Pass/Fail flag.

In this variant of the scheme, as shown in FIG. 3, the whitening value is a multiplication in a Galois field of the version number and the whitening key. In the variant of the scheme shown in FIG. 3, whitening includes an exclusive-or of the data with the whitening value, and whitening is applied to the data both before and after the DES or AES encryption on memory writes, as well as before and after the DES or AES decryption on memory reads.

An integrity value is also computed whenever a block is written out to memory. The integrity value can be a sum (e.g., "exclusive or") of all of the plaintext in the data block. Since the integrity value for a data block also needs to be protected if the data block is to be protected, and since the version number needs to be maintained and protected, the <integrity value, version number> pair for a given block is combined with similar pairs of other data blocks (e.g., nearby), and the group of pairs is written to another data block, a "meta-data" block that in turn must be protected.

Figure 4:
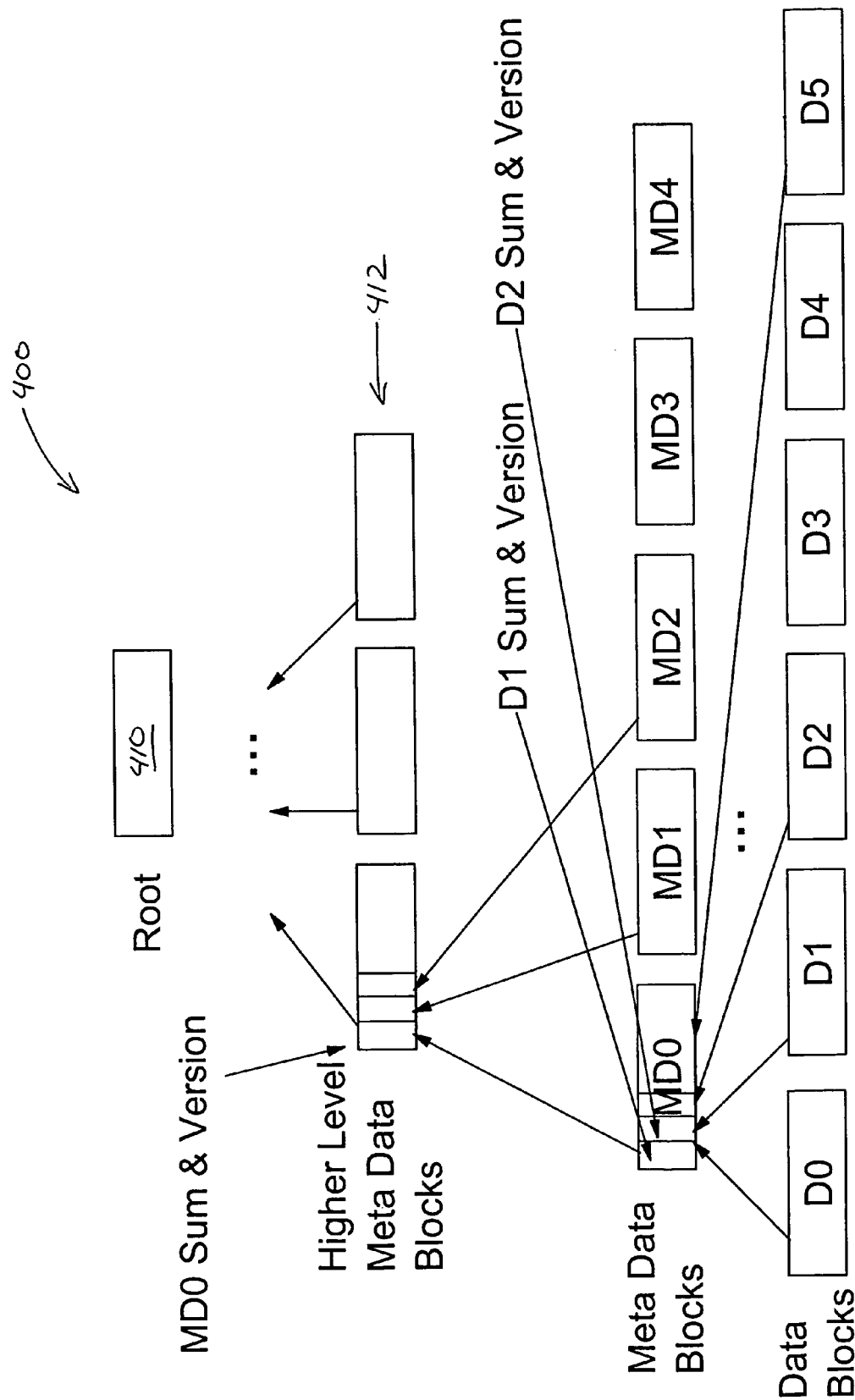
FIG. 4 shows a data diagram of an integrity tree for a secure computing device in accordance with the principles of the present disclosure.

As shown in FIG. 4, an integrity tree for a secure computing device is indicated generally by the reference numeral 400. The exemplary integrity tree 400 includes data blocks D0, D1, D2, D3, D4 and D5. The tree further includes meta-data blocks MD0, MD1, MD2, MD3 and MD4. The meta-data block MD0, for example, comprises the sum and version for all of the data blocks D0, D1, D2, D3, D4 and D5. In addition, this exemplary integrity tree includes higher-level meta-data blocks 412, one of which comprises the sum and version for all of the meta-data blocks MD0, MD1 and MD2, for example. The has a root 410, which might directly comprise the sum and version for all of the higher-level meta-data blocks 412, or might comprise meta-data blocks of even higher level in alternate embodiments.

Thus, in this variation of the scheme, the <integrity value, version number> pair for the meta-data block is combined with those of other nearby meta-data blocks and written to a higher-level meta-data block, which is, in turn, protected. The meta-data blocks including the higher-level meta-data blocks form a tree and the root of the tree protects the integrity of the entire protected memory. Although one exemplary design embodiment for an integrity tree has been described, alternative designs are also possible. For example, an integrity tree such as that described in the co-pending patent application entitled "Parallelizable Authentication Tree for Random Access Storage" (Ser. No. 10/307,673) might be employed in place of the exemplary integrity tree described here. Of course, other integrity tree designs are also possible as will be recognized by those skilled in the pertinent art.

The root of the integrity tree, as well as the encryption and whitening keys, are stored inside the secure computing device. In addition, the contents of the meta-data integrity tree are updated and verified inside the secure computing device. This means that an attacker has no visibility into the contents of the protected memory. This also means that the secure computing device can detect any modifications that an attacker may make to the contents of protected memory including any "replay" or "relocation" attacks.

The integrity tree embodiment 400 allows for off-chip storage of data. The integrity values and version numbers form a tree and only the highest-level root of the tree is stored and physically protected inside of the chip. However, alternate embodiments may be applied where there is enough on-chip storage available to store a lower level of the integrity tree below the root. If all of the integrity and version information does not fit inside the chip, but if there is sufficient on-chip memory to completely store such a lower level of the integrity tree, then it is not necessary to build an entire integrity tree up to a single highest root. For example, if the lowest level of the integrity tree fits on-chip, then it would not be necessary to maintain any higher-level integrity values. Alternatively, if the lowest level did not fit on the chip, but the next higher second level did fit on the chip, then it would not be necessary to maintain any higher levels above that second integrity level since the second integrity level would be physically protected inside of the chip.

Figure 5:
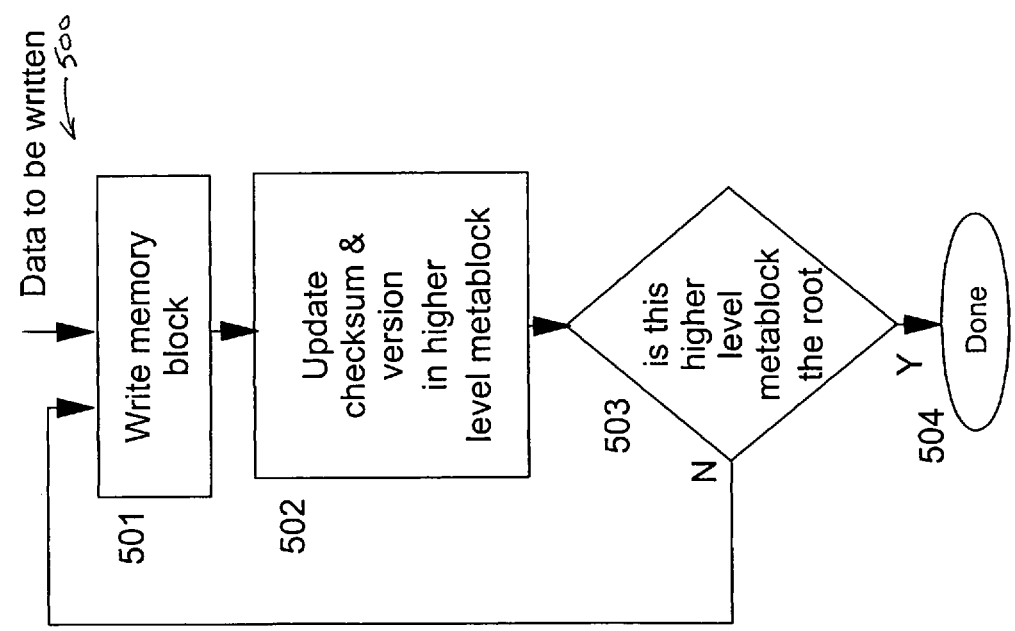
FIG. 5 shows a flow diagram of a memory write process for a secure computing device in accordance with the principles of the present disclosure.

Turning to FIG. 5, a Memory Write process for a secure computing device is indicated generally by the reference numeral 500. The process 500 receives data to be written at a function block 501, which writes the memory block and passes control to a function block 502. The function block 502 updates the checksum and version in a higher-level metablock, and passes control to a decision block 503. The decision block 503, in turn, determines whether this higher-level metablock is the root of the integrity tree. If the root is not detected, control is passed back to the function block 501. If, on the other hand, the root is detected, control is passed to a return block 504.

Thus, FIG. 5 illustrates the steps involved in writing a data block to the protected memory. The block is written out to the protected memory in step 501. In step 502, updated versions of the data block's checksum and version number are saved in the data block's "meta-data" block. If this meta-data block corresponds to the root of the integrity tree, as determined in step 503, then the process completes at step 504. If, on the other hand, the meta-data block is not the root of the integrity tree, then the meta-data block needs to be written out to the protected memory in step 501 and the checksum and version number for the meta-data block needs to be saved in a higher-level meta-data block in step 502. As before, if this higher-level meta-data block corresponds to the root, as determined in step 503, the process completes at step 504. Otherwise, the meta-data block needs to be written out to the protected memory and the process continues until a higher-level meta-data block corresponds to the root, at which point the process terminates at step 504. In this case, all of the blocks that are written out to the protected memory are protected using the encryption and integrity scheme shown in FIG. 3.

Figure 6:
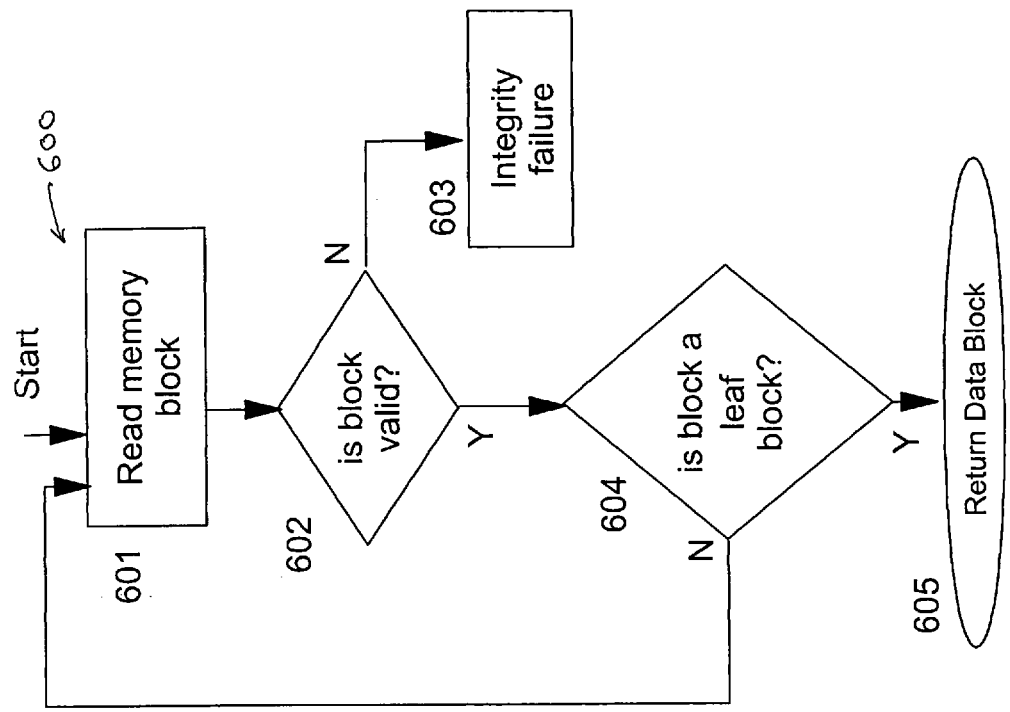
FIG. 6 shows a flow diagram of a memory read process for a secure computing device in accordance with the principles of the present disclosure.

Turning now to FIG. 6, a Memory Read process for a secure computing device is indicated generally by the reference numeral 600. The process 600 includes a function block 601, which reads a memory block and passes control to a decision block 602. The decision block 602 determines whether the block is valid, and, if not, passes control to a function block 603 to recognize an integrity failure. If, on the other hand, the block is valid, then the block 602 passes control to a second decision block 604. The second decision block 604 determines whether the block is a leaf block, and, if not, passes control back to the function block 601. If, on the other hand, the block is a leaf block, then the decision block 604 passes control to a return block 605, which returns the data block.

Thus, FIG. 6 illustrates the steps involved in reading a data block from the protected memory. In step 601, the first data block on the path from the root of the integrity tree to the desired data block is read from the protected memory. In step 602, the block's validity is checked with checksum and version information from the root of the integrity tree. If the integrity check fails, an integrity failure condition is signaled in step 603. On the other hand, if the block is determined to be valid, then a check is performed in step 604 to determine whether the block is the desired data block. If it is, the data is returned to the user in step 605. If it is not, the next data block on the path from the root to the desired data block is read in step 601. As before, the integrity of this block is checked in step 602. In addition, as before, an integrity failure condition is signaled in step 603 if the integrity check fails. As before, if the block is determined to be valid, a check is performed, in step 604, to determine whether the block is the desired data block. If it is, the data is returned to the user in step 605. If not, the next data block on the path is read and so on until either an integrity check fails in which case an integrity failure condition is signaled in step 603, or the desired data block is reached and the data is returned to the user in step 605. In this case, all of the blocks that are read from the protected memory are decrypted and have their integrity checked as shown in FIG. 3.

In addition, the blocks on the path from the root to the desired data blocks can be cached to improve performance. Using an alternate embodiment modified integrity tree, such as the one described in the co-pending patent application entitled "Parallelizable Authentication Tree for Random Access Storage" (U.S. patent application Ser. No. 10/307, 673, filed Dec. 2, 2002, now U.S. Pat. No. 7,451,310, issued Nov. 11, 2008), the integrity of data blocks on the path from the root to the desired data can be checked in parallel, further improving performance.

As shown in FIG. 7, an alternate embodiment modified boot process is indicated generally by the reference numeral 700. The process 700 includes a function block 701, which reads a Certificate containing an Owner Public Key into protected memory, and passes control to a function block 702. The block 702 validates the Certificate with the Manufacturer's Public Key, which is present on the processor, and passes control to a function block 703. The block 703, in turn, reads the Boot Code into protected memory, and passes control to a function block 704. The block 704 verifies the Digital Signature of the Boot Code with the Owner Public Key, and passes control to a decision block 705. The decision block 705 determines whether the Digital Signature is valid, and, if so, passes control to a branch block 706. The branch block 706 branches to the copy of the code in protected memory. If, on the other hand, the decision block 705 determines that the Digital Signature is not valid, it passes control to a function block 707 to signal an error.

Thus, as mentioned following the description of FIG. 3, the alternate embodiment boot process 700 of FIG. 7 may use, for example, a small number of on-chip laser trimmed fuses to identify the "owner number" for a particular chip. If the chip also includes the public key of the chip manufacturer, the chip manufacturer's public key can be used to validate a certificate that provides the public key for a given owner number.

Although illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

What is claimed is:

1. A method for ensuring that a processor will execute only authorized boot code, said method comprising:
    reading a certificate including a first public key into a protected memory;
    validating said certificate with a second public key permanently stored on said processor;
    reading a signed authorized boot code into said protected memory, wherein said protected memory is cryptographically protected;
    reading, by said processor, a digital signature used to sign said signed authorized boot code;
    decrypting said digital signature to generate a decrypted digital signature;
    verifying said decrypted digital signature in accordance with said first public key;
    executing, by said processor, said signed authorized boot code having a verified digital signature by branching to said signed authorized boot code in said protected memory, said signed authorized boot code including instructions for performing a boot process for a computer device comprising said processor, wherein said digital signature of said signed authorized boot code is previously verified and executing further comprises performing inline decryption of the copy of said signed authorized boot code in said protected memory by cryptography hardware on the processor during the boot process, wherein the performing the inline decryption further comprises generating plaintext data only within the process, the plaintext data corresponding to said copy of said signed authorized boot code from said protected memory.

2. A method as recited in claim 1 wherein the integrity of the contents of said protected memory is protected at run time by encryption using a cryptographic key stored on said processor.

3. A method as recited in claim 1 wherein said protected memory is physically protected.

4. A method as recited in claim 1 wherein the integrity of said authorized boot code is protected at run time.

5. A method as recited in claim 4 wherein the integrity of said authorized boot code is protected with symmetric key encryption.

6. A method as recited in claim 1 wherein the privacy of said authorized boot code is protected at run time.

7. A method as recited in claim 6 wherein the privacy of said authorized boot code is protected at run time with symmetric key encryption.

8. A program storage device readable by machine, tangibly embodying a program of instructions executable by the machine to perform program steps for ensuring that a processor will execute only authorized code, the program steps comprising:
    reading a certificate including a first public key into a protected memory;
    validating said certificate with a second public key permanently stored on said processor;
    reading a signed authorized boot code into said protected memory, wherein said protected memory is cryptographically protected;
    reading, by said processor, a digital signature used to sign said signed authorized boot code;
    decrypting said digital signature to generate a decrypted digital signature;
    verifying said decrypted digital signature in accordance with said first public key;
    executing said signed authorized boot code having a verified digital signature by branching to said signed authorized boot code in said protected memory, said signed authorized boot code including instructions for performing a boot process for a computer device comprising said processor, wherein said digital signature of said signed authorized boot code is previously verified and executing further comprises performing inline decryption of the copy of said signed authorized boot code in said protected memory by cryptography hardware on the processor during the boot process, wherein the performing the inline decryption further comprises generating plaintext data only within the process, the plaintext data corresponding to said copy of said signed authorized boot code from said protected memory.

9. A computing device for securely executing authorized code, said computing device comprising:
    a protected memory for storing a signed authorized boot code, which contains a digital signature, wherein said protected memory is cryptographically protected; and
    a processor comprising inline cryptography and integrity hardware for executing said signed authorized boot code, said processor in signal communication with said protected memory, said processor reading and decrypting said signed authorized boot code from the protected memory and executing said signed authorized boot code from the protected memory for booting the computing device after verifying that said digital signature contained in said signed authorized boot code is valid as decrypted in accordance with a first public key stored in said protected memory, said first public key validated by a second public key permanently stored on said processor, and branching to said signed authorized boot code in said protected memory to begin the execution, wherein the inline cryptography and integrity hardware is disposed on the processor.

10. A computing device as recited in claim 9 wherein the integrity of the contents of said protected memory is protected at run time by encryption.

11. A computing device as recited in claim 9 wherein said protected memory is physically protected.

12. A computing device as recited in claim 9 wherein at least one of the integrity of said authorized code and the privacy of said authorized code is protected at run time.

13. A computing device as recited in claim 9 wherein the integrity of said signed authorized code is protected at run time with symmetric key encryption.

14. A computing device as recited in claim 9, wherein the privacy of said signed authorized code is protected at run time with symmetric key encryption.

15. A computing device as recited in claim 9, where said processor further comprises:

a first summing block summing said read copy of said signed authorized boot code from the protected memory with a whitening value;
a decryption block decrypting an output of said first summing block;
a second summing block summing an output of said decryption block with said whitening value to generate plaintext data corresponding to said copy of said signed authorized boot code from said protected memory; and
a function block validating said plaintext data for execution.

* * * * *